Inventor
Howard A. Morris
By Owen & Owen
Attorneys

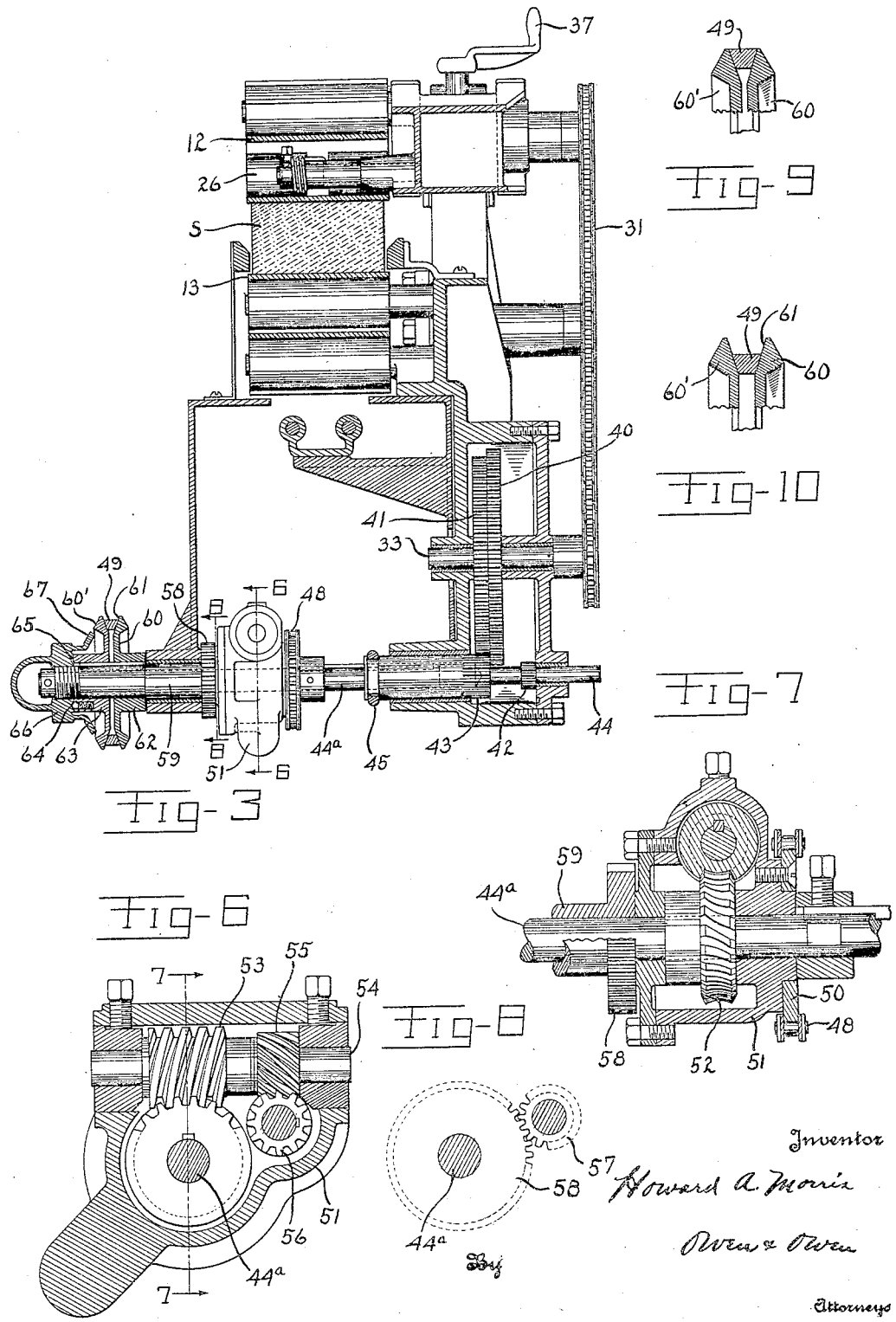

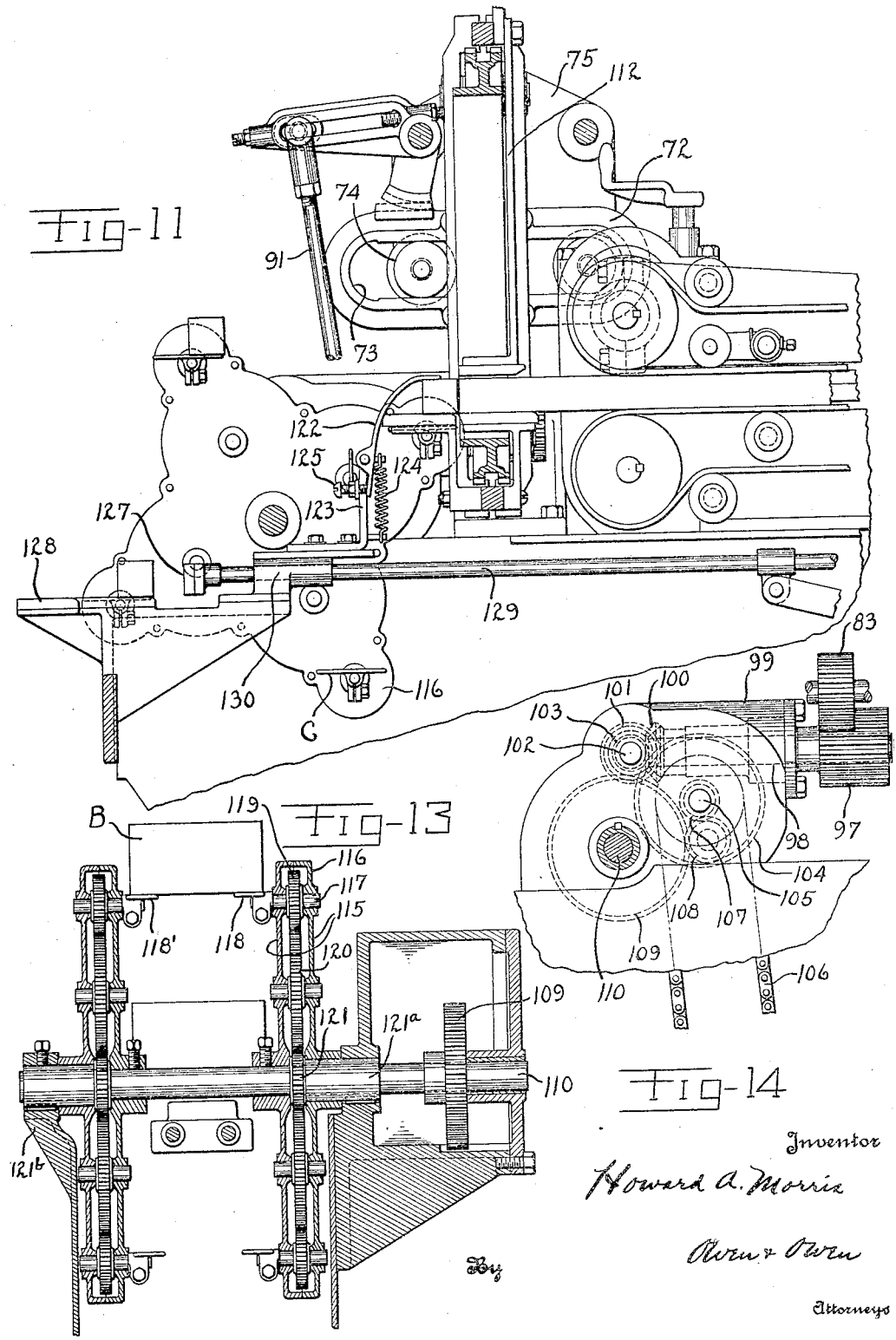

June 20, 1933.   H. A. MORRIS   1,914,701
MACHINE FOR PRODUCING BARS OF BUTTER OR LIKE MATERIALS
Filed Nov. 9, 1931   5 Sheets-Sheet 5

Inventor
Howard A. Morris
By Owen & Owen
Attorneys

Patented June 20, 1933

1,914,701

UNITED STATES PATENT OFFICE

HOWARD A. MORRIS, OF TOLEDO, OHIO, ASSIGNOR TO THE AUTOMAT MOLDING & FOLDING COMPANY, OF TOLEDO, OHIO, A CORPORATION OF OHIO

MACHINE FOR PRODUCING BARS OF BUTTER OR LIKE MATERIALS

Application filed November 9, 1931. Serial No. 573,782.

This invention relates to machines for handling bars of butter, oleomargarine, or like plastic or semi-plastic materials, but more particularly to machines of this type designed to cut bars of a predetermined size from a slab of material and deliver them to the wrapping and packaging mechanism.

An object of this invention is to produce a machine for continuously advancing a slab of material, such as butter, and during the advancing movement cut the same into bars of a predetermined size.

Another object is to produce a machine of the above character having a continuously advancing feeder and cutter mechanism operating during the advancing movement, which is adapted by simple adjustment to produce different sized bars so that, for example, butter bars of one, one-half, or one-quarter pound size may be obtained.

A further object is to convey the cut bars from the feeder in a new and improved manner so that they will not adhere or stick to the unsevered mass or slab.

A still further object is to enable slight variations in the size or weight of the severed bar to be obtained by means of a simple adjustment which can be made while the machine is in operation or idle.

Still further objects are to produce new and improved mechanisms for advancing a slab of material, such as butter, cutting the same into bars, and carrying away the severed bars in the simple and efficient manner hereinafter described.

Other objects and advantages will hereinafter appear, and, for purposes of illustration but not of limitation, an embodiment of the invention is shown on the accompanying drawings, in which:

Figure 3 is a vertical sectional elevation on the line 3—3 of Fig. 1;

Figure 6 is a section on the line 6—6 of Fig. 3 of the differential for driving the feeder;

Figure 7 is a section on the line 7—7 of Fig. 6;

Figure 8 is a sectional view on the line 8—8 of Fig. 3;

Figures 9 and 10 are enlarged fragmentary sectional views of the adjustable driving sheave connected to drive the feeder, showing the same in two positions of adjustment;

Figure 11 is a view similar to Fig. 2 showing the machine adjusted for cutting and handling one-quarter pound bars;

Figure 13 is a vertical sectional view substantially on the line 13—13 of Fig. 2 showing the carrier device for the severed bars;

Figure 14 is a view partly in elevation and partly in section showing the driving gears for the cutter mounting or frame and the carrier device; and Figure 15 is a vertical sectional elevation of the spring support for the outer end of the upper feed belt supporting arm.

Figure 1:
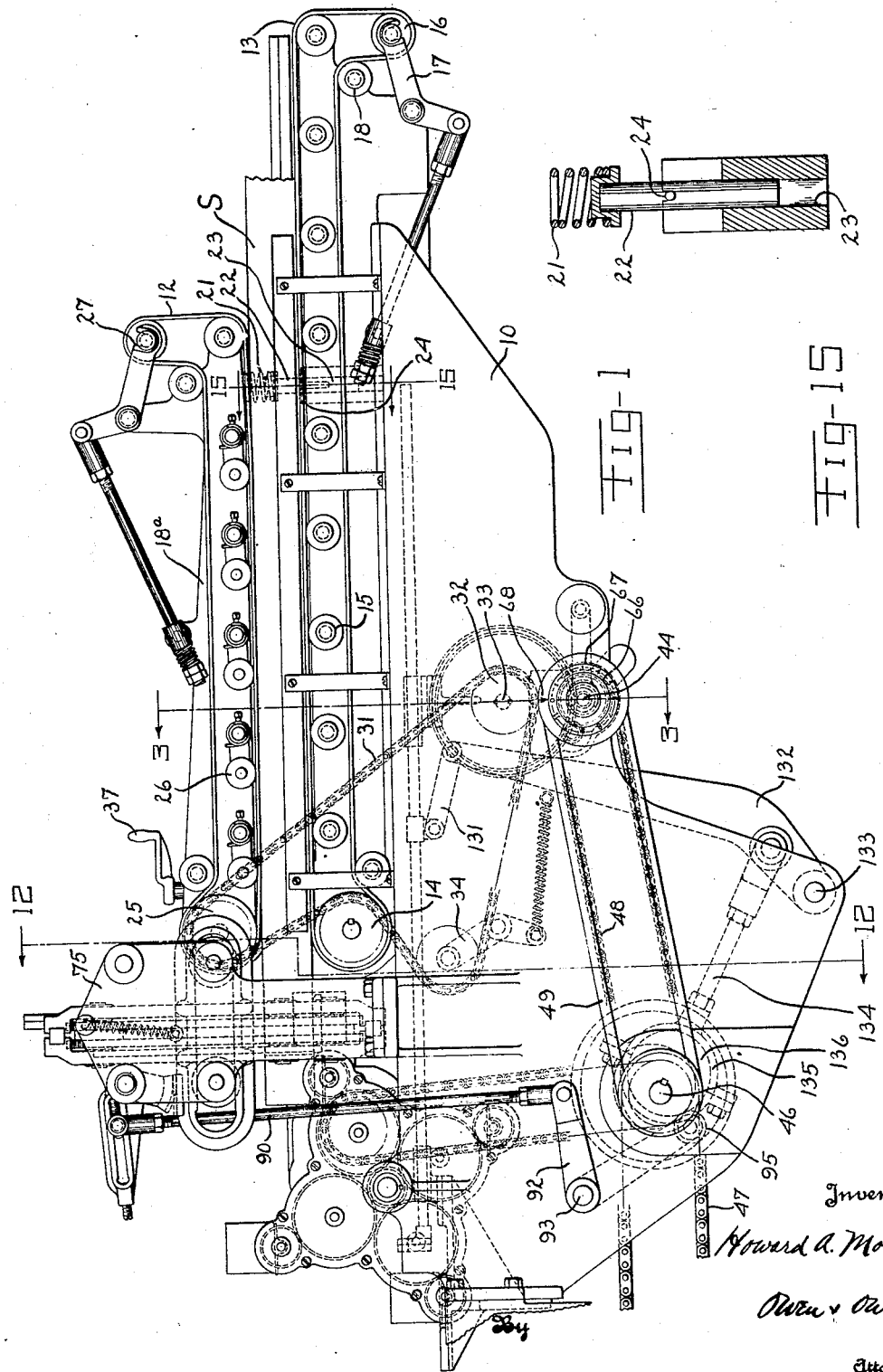
Figure 1 is a side elevation of a machine for advancing a slab of butter, cutting the same into bars of a predetermined size and conveying such bars to a wrapping mechanism.

The illustrated embodiment of this invention comprises a machine to which is delivered or fed an elongate slab or bar of butter, oleomargarine, or other similar plastic or semi-plastic material. This slab first encounters a continuously moving feeder or conveyor so that the material is continuously fed along the machine, and during such movement a cutter operates to sever the slab of material into sections or bars of a predetermined size. The feeder and cutter are adjustable so that bars of different sizes may be produced, as for example one pound, one-half pound or one-quarter pound bars. After a bar is cut from the slab it encounters a carrier which moves in such manner that the bar does not adhere or stick to the slab or next succeeding bar. The carrier is composed of a plurality of units which preferably move continuously so that a carrier is always positioned properly to receive a bar discharged from the feeder. After the bar has been moved to a predetermined point, a discharging device engages and advances it from the carrier where it may encounter a wrapping mechanism for wrapping the individual unit or bar with relatively light flexible sheet material preparatory to packaging. The wrapping and packaging mechanisms form no part of the present invention, and neither illustration or description thereof is deemed necessary.

The frame 10 of the machine is supported on suitable uprights 11, and at the rear end of this frame is disposed the feeder to which the elongate slab S of material is delivered. The feeder comprises a pair of endless belts 12 and 13 with the belt 12 uppermost. The lower belt 13 at one end is trained over a driving sheave 14, and the upper flight passes over a series of guide rollers 15. The opposite end of the belt passes over a sheave 16 carried by a spring controlled tightening device 17. The lower flight of the belt 13 is guided over rollers 18 disposed respectively adjacent the driving sheave 14 and the tightener sheave 16.

The upper feed belt 12 is carried by an arm 18ª, which is provided at its inner end with a sleeve 19 journaled in the frame 10, which provides a bearing for a drive shaft 20. The mounting of the arm 18ª is such that the outer end is free, but is resiliently supported on a coil spring 21, the lower end of which is fixed to a pin 22 extending into a socket 23. A cross pin 24 on the pin 22 is seated in the socket 23 but may be turned and moved to another seat deeper in the socket when the feed belt 12 is moved downwardly to accommodate a thinner slab.

Figure 4:
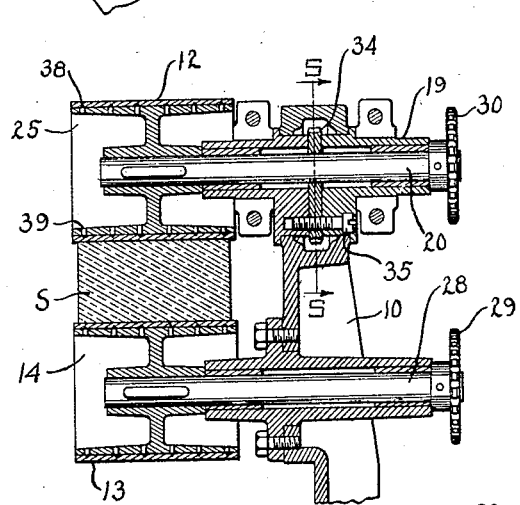
Figure 4 is a vertical sectional elevation on the line 4—4 of Fig. 2 showing the driving connections for the feeder belts and the adjusting device for the upper drive belt.
Figure 5:
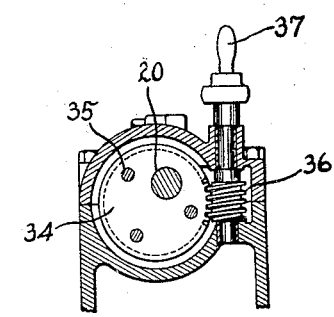
Figure 5 is a section on the line 5—5 of Fig. 4.

The inner end of the belt 12 passes around a drive sheave 25, and a series of spring pressed rollers 26 bear against the lower flight of the belt to hold the same in feeding engagement with the slab S. A spring controlled belt tightener 27 engages the opposite end of the belt 12 for maintaining the same taut. As shown in Figure 4, the driving sheave 14 is secured to a shaft 28 having a sprocket 29. The drive shaft 20 for the sheave 25 also has a sprocket 30, and a chain 31 engages both sprockets 29 and 30, and leads to sprocket 32 on a shaft 33, a spring controlled tightener 34' being provided for the chain 31.

In order to raise or lower the inner end of the arm 18ª to accommodate different sized slabs, a worm wheel 34 is eccentrically mounted on the drive shaft 20. The worm wheel 34 is secured to the sleeve 19 of the arm 18ª by screws 35 so that the arm 18ª moves with the wheel 34. Engaging the wheel 34 is a worm 36, to which is connected an operating handle 37. By turning the handle 37 in one direction or the other the arm 18ª is raised or lowered as desired, and to compensate for this adjustment the spring support 21 is accordingly adjusted as above indicated.

The belts 12 and 13 are continuously driven and the slab S is delivered thereto at the outer end of the belts, it being noted that the lower belt 13 extends outwardly a distance beyond the outer end of the belt 12. Each of the belts 12 and 13 are provided with a series of indentations 38 on their inner surfaces with which pins 39 on the driving sheaves 14 and 25 are engageable to militate against slipping of the belts during operation. As above mentioned the conjoint drive for the feed belts 12 and 13 is from a shaft 33, and secured to this shaft is a relatively large gear 40 and a relatively small gear 41, which may selectively mesh respectively with pinions 42 and 43 on a drive shaft 44, which is axially shiftable by a yoke 45 for engaging one or the other pinions with the respective driven gear. In this instance the larger gear 40 is designed to drive the slab feeder at the proper speed for producing one-quarter pound bars, whereas the smaller gear 41 is designed for properly driving the feeder for producing one pound or one-half pounds bars, as will more fully hereinafter appear. The shaft 44 is connected to be driven from a drive shaft 46, which in turn has a sprocket and chain connection 47 with any suitable source of power, such as an electric motor.

In operation, it often becomes necessary slightly to increase or decrease the size of the bar, whether it be a one pound, one-half pound or one-quarter pound size in order to obtain the desired weight. This may be necessary in view of the kind of material being handled, its consistency, water and fat content, salt content, etc. In accordance with this invention the speed of the feeding belts may be slightly increased or decreased independently of the operation of the remaining mechanism, such as the cutter and carrier mechanism. As shown, the shaft 44 has a sprocket and chain connection 48 and a belt connection 49 with the drive shaft 46. A sprocket 50 about which the chain 48 is trained, is fastened to a differential housing 51, which rotates with the sprocket 50. In the housing 51 is a worm wheel 52 secured to a shaft 44ª which is keyed to and telescopes with the shaft 44. The wheel 52 meshes a worm 53 secured to a shaft 54 journaled in the housing 51. Rotatable with the shaft 54 is an helical gear 55, which meshes with an helical gear 56, to which is secured a pinion 57 meshing with a gear 58. The gear 58 rotates with a shaft 59, which telescopes with the shaft 44ª, and keyed to the shaft 59 is a sheave having complemental parts 60 and 60' each part having oppositely beveled or tapered surfaces 61 to receive the belt 49, which is wedge-shaped in cross section to correspond with the taper of the surface 61.

The sheave part 60 has a hub 62, and the sheave part 60' has a hub 63 in which is socketed a spring pressed ball 64 which engages in one of an annular series of indentations 65 on a cap or knob 66, which is in screw threaded engagement with the outer end of the shaft 59. As shown in Figure 1, the cap 66 is provided with an annular flange 67 containing calibrations from zero to eleven, which are adapted to be brought into registration with an arrow 68 on the outer side of the sheave part 60'. In this instance the calibrations indicate a weight difference obtainable by turning the cap 66 in one direction or the other, so that the weight of the butter bar discharged by the feeder belt is increased or diminished in accordance with the amount of adjustment.

When the cap 66 is screwed inwardly to cause the sheave part 60' to move toward the sheave part 60, the belt 49 is cammed outwardly, and this adjustment increases the speed of the feeder belts through the connections above described. On the other hand when the cap 66 is unscrewed to allow the belt 49 to move inwardly towards the axis of rotation of the driving sheave the speed of the feeder belts is correspondingly decreased. From the above description it is manifest that slight changes in the speed of movement of the feeder belts may be effected while the machine is in operation so that it is unnecessary to stop the machine to make small corrective adjustments in the operation of the driving mechanism to obtain the desired weights.

The feeder belts 12 and 13 advance the slab S to the cutting mechanism which operates recurrently to sever from the slab a bar B of predetermined size, the size of the bar depending on the adjustment of the various parts. The cutting mechanism comprises a frame having a pair of oppositely disposed arcuate side arms 69, which are connected at their upper ends by a cross bar 70 and at their lower ends by a cross bar 71. Extending at substantially right angles to the arms 69, and disposed centrally thereof, are guide plates 72 integral with the respective arms 69. Each guide plate 72 is provided with a horizontally elongate guideway 73, in which are disposed a pair of laterally spaced stationarily mounted rollers 74 journaled in an upright frame plate 75 secured to the machine frame 10.

Secured to the rear face of the lower cross bar 71 and extending upwardly therefrom is a T-shaped bracket 76 having a wooden platform 77 to which the slab S is delivered by the feeding mechanism. Spaced forwardly a short distance from the forward end of the platform 77 is a wooden platform 78 carried by a substantially Z-shaped bracket 79 secured to the front face of the cross bar 71. Operating in the space between the platform 77 and 78 is a ring or annulus 81 to which is connected a transverse, diametrically disposed cutting wire 80. Formed on the periphery of the annulus 81 are two laterally spaced rows of gear teeth 82, with which meshes a gear 83 mounted on one of the frame arms 69. For guiding the rotary movements of the annulus 81 are four rollers 84 mounted on the frame arms 69, and engaging the annulus in the region between the rows of teeth 82.

Figure 2:
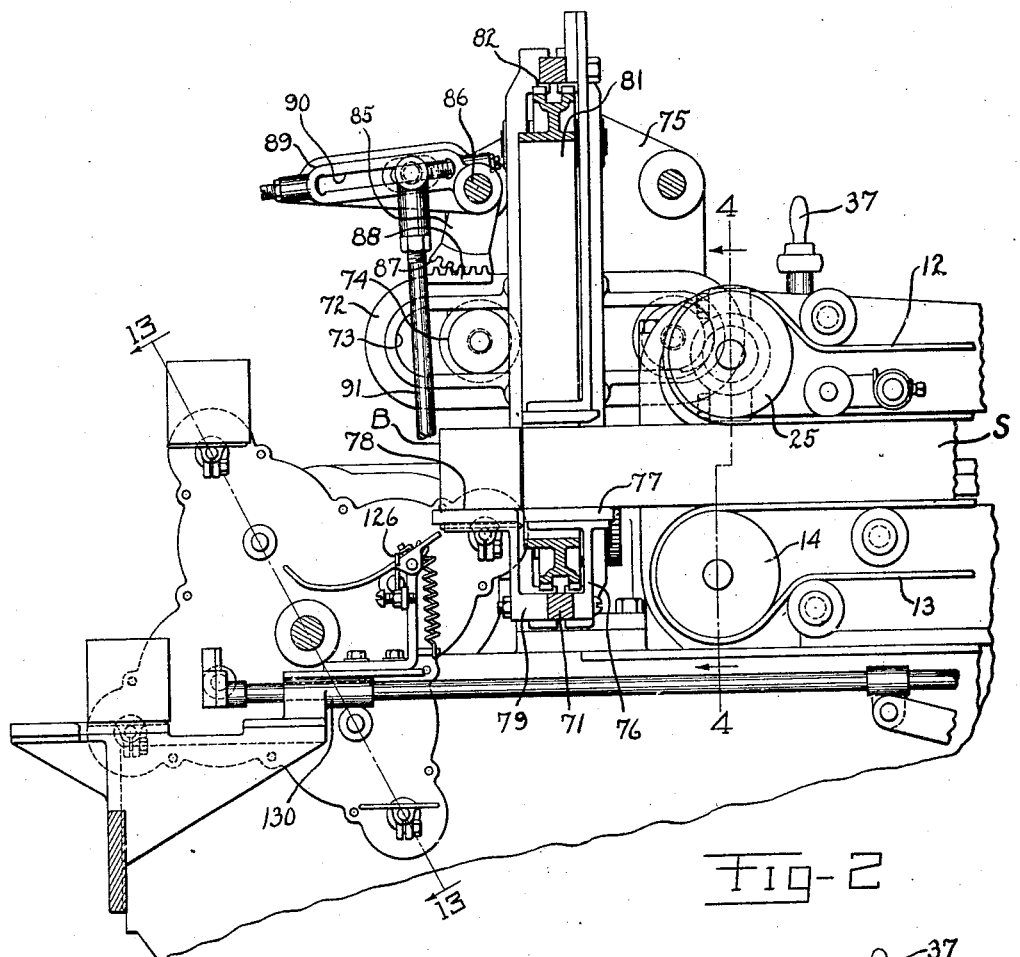
Figure 2 is an enlarged elevation partly in section of the forward end portion of the machine adjusted for one pound bars, showing in more detail the cutting and carrier mechanisms.

The cutter mounting and associated parts are reciprocated horizontally by a pair of arms 85 secured to a rock shaft 86 at one end. Formed on the opposite ends of the arms 85 are toothed sectors 87 meshing with teeth 88 formed in the upper portion of the guideway 72. For operating the rock shaft 86 an arm 89 is secured thereto and projects at right angles to the axis thereof. The arm 89 is provided with a longitudinally elongate slot 90 to receive the upper end of a vertical actuating rod 91. The upper end of the rod 91 may be adjusted to and secured in the desired position in the slot 90. Figure 2 illustrates the adjustment for one pound and one-half pound bars (the width of each of these being the same, the variation being in the thickness), and Figure 11 shows the position that the rod assumes for handling one-quarter pound bars. As shown, the lower end of the rod 91 is pivoted to an arm 92 which is secured to a shaft 93, and also secured to the shaft 93 is an arm 94 having a roller 95, which rides in a track formed in a cam 96.

During the reciprocating movements of the cutter mounting above described, the annulus 81 is continuously rotated by means of the above mentioned gear 83. As shown in Figure 14, the gear 83 meshes with a gear 97, which is wider than the gear 83 and enables the latter to move axially during the reciprocatory movements of the cutter mounting. The gear 97 is mounted on a shaft 98, which is journaled in the gear case 99, and a beveled gear 100 is mounted on the opposite end of the shaft 98. The beveled gear 100 meshes with a beveled gear 101 on a shaft 102 on which is fixed a pinion 103 which meshes with a gear 104 fixed to a shaft 105. The shaft 105 has a sprocket and chain connection 106 with the driving shaft 46. The shaft 105 is connected through pinions 107 and 108 and gear 109 to a shaft 110 for driving the carrier mechanism, as will hereinafter appear.

Figure 12:
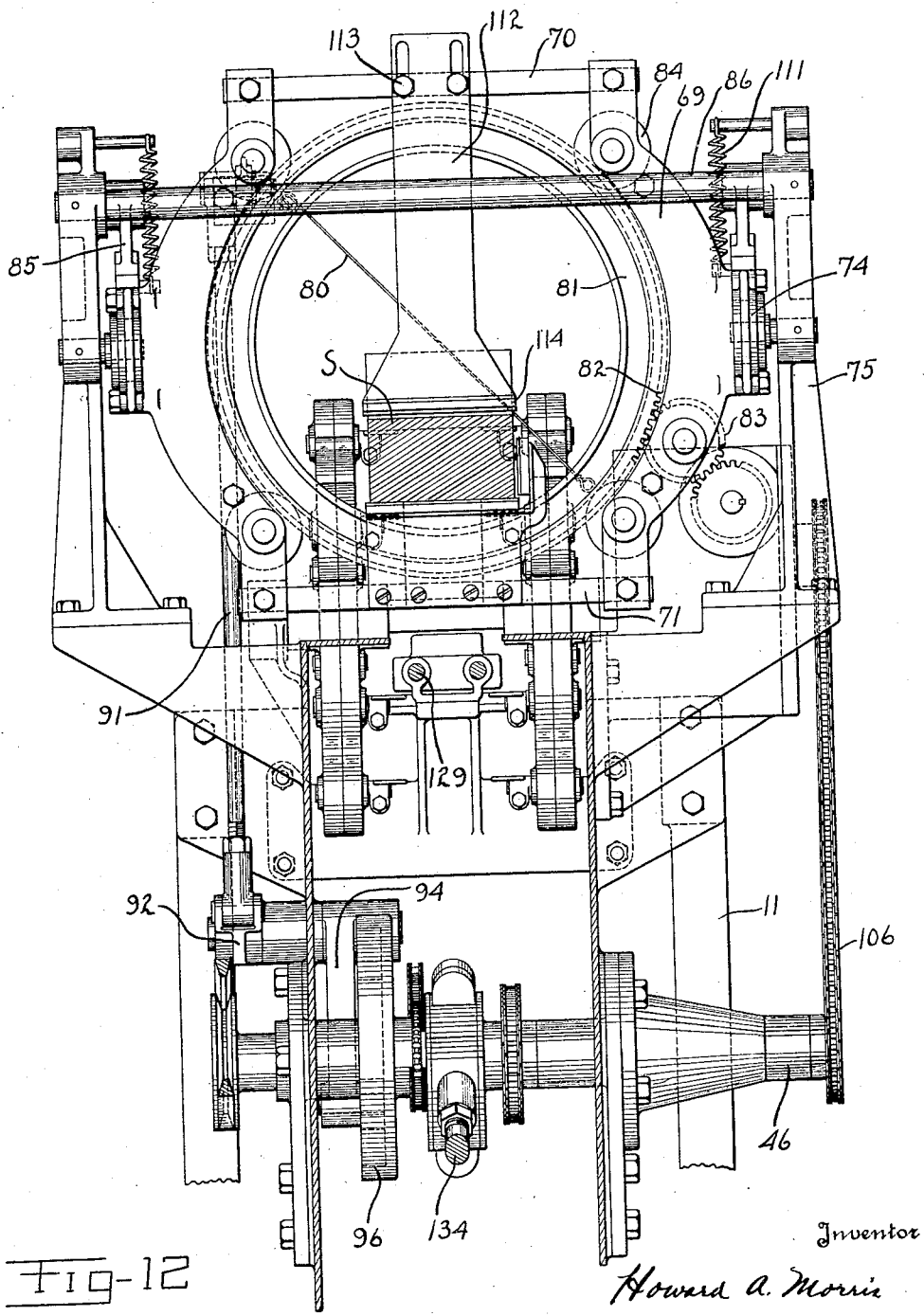
Figure 12 is a vertical sectional elevation substantially on the line 12—12 of Fig. 1.

As shown particularly in Figure 12, coil springs 111 are secured at their upper ends to the upright frame plates 75 and at their lower ends to the arms 72 to relieve a portion of the weight imposed upon the rollers 74 by the cutter frame. It will also be observed in this figure that a plate 112 is adjustably connected at 113 to the cross bar 70 and is provided at its lower end with a foot 114 disposed above the slab S. This is for the purpose of preventing upward movement of the slab upon the retrograde movement of the cutter mounting. The plate 112 may be raised or lowered, according to the size of the slab which the machine is handling.

It is to be understood that the annulus 81 rotates at such speed that as the mounting advances, which movement is substantially the same as that of the feeder belts, the wire 80 passes through the space between the platform 77 and 78, and gradually severs a bar B from the slab S. After this operation is performed, the cutter mounting retracts, the slab S passing through the opening in the annulus in rear of the cutter, whereupon the above severing operation is repeated. Since the slab S continues its advancing movement, it pushes the severed bar B forwardly onto one of the carriers C of the carrier mechanism.

The carrier C consists of two parts, which are of identical construction, and are each secured to the shaft 110 for movement therewith. As particularly shown in Figure 13, each part comprises side plates 115 provided with four extensions 116 in which are journaled stub shafts 117, to the inner end of which is secured a platform 118. A gear 119 is mounted for rotation with the shaft 117 within the side plates 116, and this gear meshes with a larger gear 120, which in turn meshes with a pinion 121 fixed to a sleeve 121$^a$ which is keyed to the gear case 99 in one instance and to the bearing 121$^b$ in the other instance. As shown in Figure 13, a platform 118' is disposed directly opposite to the platform 118, and is operated in a similar manner, so that both platforms move together and are at all times in alignment. In each of the four extensions 116 are similar platforms mounted and operated in the same manner as above described, so that description thereof is deemed unnecessary.

It is apparent from the above description that the carrier C rotates with the shaft 110, and, owing to the gear connections, the pairs of platforms 118 and 118' gradually turn in the opposite direction from their traveling movement so as to be in a horizontal position at all times. The parts are so constructed and operated that as each pair of platforms 118 and 118' are in the region of the wooden platform 78 of the cutter mounting, the severed bar B is pushed by the slab S onto a carrier unit. Since the carrier units move in an arcuate path away from the slab, liability of the bar B sticking or adhering to the unsevered mass is greatly reduced.

In order to insure that the bar B remains in the proper position on the carrier a finger 122 is pivoted to a bracket 123 and urged by a coil spring 124 against an adjustable stop 125 which retains it in the desired position. The outer end of the finger 122 is curved and engages the upper surface of the bar B holding it in place on the carrier C. As the carrier continues to move the finger is rocked out of the path of movement, and thereafter snaps back into position for the next succeeding bar. The finger 122 is not usuable for the one pound bars, and a latch 126 is adapted to hold it in inoperative position, as shown in Figure 2.

The bars B are individually discharged from the carrier C by a ram 127 when the respective units align with a platform 128. The ram 127 is mounted on rods 129 which are guided in brackets 130. The rods are connected through a link 131 to a lever 132, which is pivoted to the machine frame at 133. Rocking movement is imparted to the lever 132 through a rod 134, which has a yoke 135 at its inner end. The yoke 135 engages an eccentric 136 mounted on the shaft 46.

In forming bars of butter or oleomargarine it is customary in the trade to employ a machine known as a "printer" to which the butter is delivered from vats or tubs, and which compresses it into an elongate slab rectangular in cross section. A length of slab is delivered from the printer to a platform where an operator actuates a cutting frame for simultaneously severing the slab into a plurality of bars of uniform size. This necessitates an interruption in the operation of the printer until the slab could be cut into bars and the bars moved out of the way to make room for another slab. In modern plants two operators are ordinarily employed, one for operating the cutting frame and the other to move the severed bars after they are cut.

The advantages of this invention over the above procedure are obvious. Not only is production materially increased, but the expense of at least two operators is eliminated. Furthermore, in the present machine no handling of the butter is necessary, and, consequently, it is a much more sanitary method. A further advantage resides in the obtaining of a square cut bar which is much neater in appearance than that obtained from the usual practice. It is found that in cutting the slab by a plurality of wires on a cutting frame and the subsequent forcing of the bars together after being simultaneously cut, so jammed the bars together that they adhered to one another, and, when subsequently separated the individual bars were rough and irregular. This also impaired the weight of the bar so that the bars were unequal in weight.

It is to be understood that numerous changes in details of construction, arrangement and operation may be effected without departing from the spirit of the invention, especially as defined in the appended claims.

What is claimed is:

1. In a machine for handling butter and the like, a frame having a pair of oppositely disposed arcuate side arms, a guide plate on each of said arms, means cooperating with said guide plates for guiding the reciprocatory movements of said frame, a ring mounted inside of said side arms and through which a slab of butter is movable, a cutting wire extending diametrically across said ring and secured thereto, means for imparting reciprocatory movements to said frame, gear teeth on the periphery of said ring, and means engaging said gear teeth for rotating said ring during the reciprocating movement of said frame.

2. In a machine for handling butter and the like, a frame having a pair of oppositely disposed arcuate side arms, a guide plate on each side arm, each guide plate having a horizontally elongate slot, a roller mounted on a stationary axis and engageable in each slot, a ring mounted inside of said arcuate side arms and through which a slab of butter is movable, rollers on said side arms engaging said ring, a cutting wire extending across said ring, means for rotating said ring, and a rocker arm having a toothed connection with each guide plate for reciprocating said frame.

In testimony whereof I have hereunto signed my name to this specification.

HOWARD A. MORRIS.